United States Patent
Kishii et al.

(10) Patent No.: US 8,062,785 B2
(45) Date of Patent: Nov. 22, 2011

(54) BATTERY MODULE AND BATTERY PACK USING THE SAME

(75) Inventors: Daisuke Kishii, Osaka (JP); Naohisa Morimoto, Osaka (JP); Shunsuke Yasui, Osaka (JP); Toshiki Itoi, Nara (JP); Shinya Geshi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/119,624

(22) PCT Filed: Jul. 13, 2010

(86) PCT No.: PCT/JP2010/004523
§ 371 (c)(1),
(2), (4) Date: Mar. 17, 2011

(87) PCT Pub. No.: WO2011/007547
PCT Pub. Date: Jan. 20, 2011

(65) Prior Publication Data
US 2011/0171505 A1     Jul. 14, 2011

(30) Foreign Application Priority Data
Jul. 17, 2009   (JP) ................ 2009-168519

(51) Int. Cl.
*H01M 2/10*   (2006.01)
*H01M 2/20*   (2006.01)
*H01M 2/34*   (2006.01)

(52) U.S. Cl. ............................. 429/159; 429/61

(58) Field of Classification Search .............. None
See application file for complete search history.

(56) References Cited

U.S. PATENT DOCUMENTS

| 2005/0233210 A1 | 10/2005 | Horie et al. |
| 2006/0019155 A1* | 1/2006 | Seman et al. ............ 429/159 |
| 2010/0216010 A1* | 8/2010 | Straubel et al. ......... 429/160 |

FOREIGN PATENT DOCUMENTS

| JP | 10-050281 | 2/1998 |
| JP | 2000-197260 | 7/2000 |
| JP | 2002-025510 | 1/2002 |
| JP | 2002-369372 | 12/2002 |
| JP | 2005-183113 | 7/2005 |
| JP | 2007-273179 | 10/2007 |
| JP | 2008-181822 | 8/2008 |

* cited by examiner

*Primary Examiner* — Jonathan Crepeau
(74) *Attorney, Agent, or Firm* — McDermott Will & Emery LLP

(57) ABSTRACT

In a battery module including a plurality of batteries 40 stored in a housing, each of the batteries 40 includes an electrode portion 16 protruding from a battery case 5, a base 30A is arranged on a side of the electrode portions 16 so that the base 30A is in contact with the battery cases 5, and the electrode portions 16 are inserted in through holes 36 provided in the base 30A. Connection portions 320 connected to the electrode portions 16 are formed on upper surfaces of the electrode portions 16. A connection terminal 32 for connecting the batteries 40 in parallel is formed in a region on the base 30A in which the connection terminal 32 does not cover the through holes 36. The connection terminal 32 is connected to the connection portions 320 by fusible links 320A straddling the through holes 36.

13 Claims, 15 Drawing Sheets (a)

(b)

(c)

(a)

(b)

(a)

(b)

(a)

(b)

(a)

(b)

US 8,062,785 B2

BATTERY MODULE AND BATTERY PACK USING THE SAME

RELATED APPLICATIONS

This application is the U.S. National Phase under 35 U.S.C. §371 of International Application No. PCT/JP2010/004523, filed on Jul. 13, 2010, which in turn claims the benefit of Japanese Application No. 2009-168519, filed on Jul. 17, 2009, the disclosures of which Applications are incorporated by reference herein.

TECHNICAL FIELD

The present invention relates to battery modules including a plurality of batteries aligned and stored in housings and to battery packs using the same.

BACKGROUND ART

In recent years, in view of savings in resources and conservation of energy, there have been increasing demands for nickel-hydrogen secondary batteries, nickel-cadmium secondary batteries, lithium ion secondary batteries, etc. which can be used repeatedly. Among them, lithium ion secondary batteries are characterized by lightness in weight, high electromotive force, and high energy density. Thus, there are growing demands for the lithium ion secondary batteries as power sources for driving various kinds of mobile electronic devices and portable communication devices such as mobile phones, digital cameras, video cameras, and laptop personal computers.

On the other hand, to reduce used amount of fossil fuel, and to reduce the amount of emission of $CO_2$, expectations for battery packs are growing to serve as power sources for driving motors such as vehicles. Such a battery pack includes a plurality of battery modules in which a plurality of batteries is connected in series and/or in parallel in order to obtain a preferable voltage and capacity.

Here, when a problem such as generation of excessive heat occurs in a battery included in the battery modules, thermal runaway, or the like may cause a serious problem such as rupture of the battery.

For this reason, an example of a battery pack used as a power source of a personal computer, or the like is disclosed, where the battery pack includes batteries connected in series by a thermal fuse, or the like (see, for example, PATENT DOCUMENT 1). Moreover, a mechanism was provided in which when an external short circuit occurs between external terminals of the battery pack, an overcurrent is detected by a protection IC provided on a safety protection circuit board, and a current is cut off by a FET device. However, since the thermal fuse is connected to leads of the batteries by soldering, or the like, control is required so that the thermal fuse is not blown at a temperature at the time of the connection, which causes problems in workability and productivity.

For this reason, a battery pack including a current cutoff mechanism is disclosed (see, for example, PATENT DOCUMENT 2). In the current cutoff mechanism, a first connection plate is connected to a second connection plate by a contact, around which a foaming layer having insulating properties is provided, and the thickness of the foaming layer is increased by excessive heat generated in the battery so that the contact is opened.

Moreover, an example of a battery pack in which PTC elements and fuses are connected in series is disclosed, wherein the fuses are formed in a stripe pattern of a thin film on an insulating substrate (see, for example, PATENT DOCUMENT 3).

Citation List

Patent Document

PATENT DOCUMENT 1: Japanese Patent Publication No. H10-50281
PATENT DOCUMENT 2: Japanese Patent Publication No. 2000-197260
PATENT DOCUMENT 3: Japanese Patent Publication No. 2002-25510

SUMMARY OF THE INVENTION

Technical Problem

However, in the battery pack of PATENT DOCUMENTS 1-3, when a problem occurs in any of the batteries connected in series, the fuse is blown so that the battery pack completely stops its operation, which causes such a problem that the batteries having no problem go to waste.

Moreover, in the battery pack of PATENT DOCUMENTS 1-3, when a plurality of batteries is connected in parallel, and a problem such as an internal short-circuit occurs in one of the batteries connected in parallel, the following problems arise.

First, a phenomenon of a problem in the case of an internal short-circuit in one of batteries connected in parallel will be described with reference to FIGS. 20A and 20B.

FIG. 20A is a schematic view illustrating normal operation of a battery module including batteries connected in parallel. FIG. 20B is a schematic view illustrating operation of the battery module, where one of the batteries connected in parallel has an internal short-circuit.

As illustrated in FIG. 20A, when a battery 1040 in the battery module including n batteries connected in parallel is charged with or discharges a current (i) during normal operation, a current of n×i flows from or to an external device through a connection terminal 1032 by which the batteries are connected in parallel.

However, as illustrated in FIG. 20B, when an internal short-circuit occurs in one of the batteries 1040 connected in parallel, a short-circuit current of (n−1)×E/r (denoted as I in the figure) flows from the remaining (n−1) batteries connected in parallel to a battery 1040A having the internal short-circuit. Here, E is the open-circuit voltage of the battery, and r is the sum of the internal resistance of the battery and the interconnect resistance of a connection terminal. Generally, provided that E=3.6 V and r=50 mΩ in the case of a lithium ion battery, the short-circuit current of a battery is 72 A. Thus, when 10 batteries are connected in parallel, a current of 648 A (=72 A×9) as a total short-circuit current flows in the battery having the problem.

As a result, an influence of generation of excessive heat or ignition of discharged gas due to an increase in internal pressure in the battery having the problem extends over neighboring batteries, which causes the problem of consecutively deteriorating the batteries.

The present invention was devised to solve the above problems. It is an object of the present invention to provide a battery module and a battery pack using the same, wherein a battery having a problem and connected in parallel is effectively disconnected to prevent unsafe operation and to allow long-term use.

Solution to the Problem

To achieve the object, a battery module of the present invention is a battery module including: a plurality of batteries aligned and stored in a housing, wherein each of the batteries includes an electrode portion protruding from a battery case, a base is arranged on a side of the electrode portions of the batteries, the electrode portions of the batteries are inserted in a plurality of through holes, respectively, provided in the base, connection portions connected to the electrode portions are formed on upper surfaces of the electrode portions of the batteries, a connection terminal for connecting the batteries in parallel is formed in a region on the base in which the connection terminal does not cover at least the plurality of through holes, and the connection terminal is connected to the connection portions for the batteries by fusible links straddling the through holes.

With this configuration, a battery which has a problem and is connected in parallel can be disconnected to ensure prevention of failure operation, so that it is possible to obtain a battery module which is safe and has high reliability. Moreover, the battery having the problem is safely disconnected, so that the rest of the batteries connected in parallel are effectively used to obtain a battery module which can be used for a long period of time.

Moreover, a battery pack of the present invention is a battery pack including multiple ones of the battery module, wherein the battery modules are aligned and connected in series and/or in parallel. With this configuration, it is possible to provide a battery pack having a given voltage and capacity depending on the application.

Advantages of the Invention

According to the present invention, it is possible to obtain a battery module which can be used for a long period of time, and a battery pack using the same.

DESCRIPTION OF EMBODIMENTS

Figure 1:
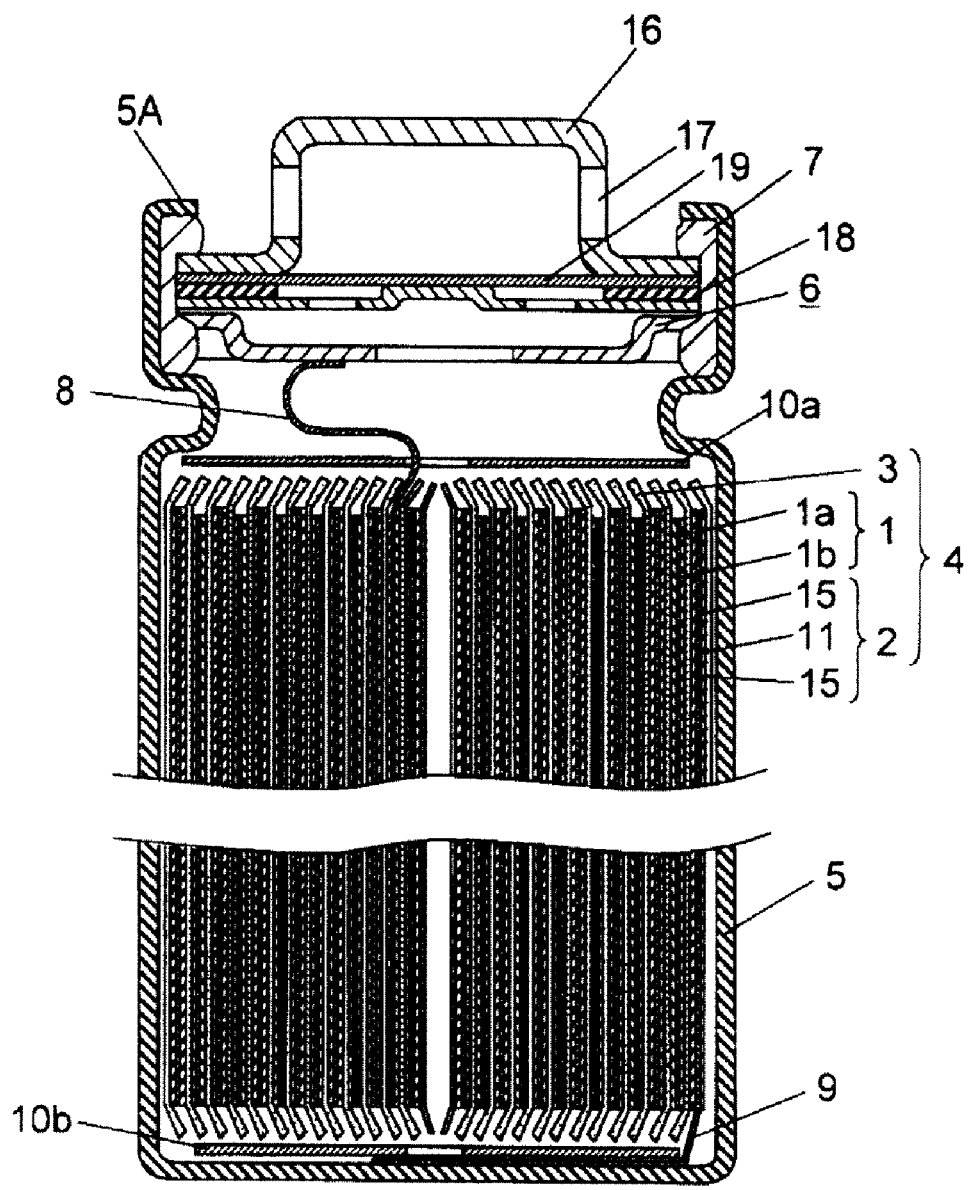
FIG. 1 is a cross-sectional view of a battery included in a battery module of a first embodiment of the present invention.

A battery module of an example of the present invention is a battery module including: a plurality of batteries aligned and stored in a housing, wherein each of the batteries includes an electrode portion protruding from a battery case, a base is arranged on a side of the electrode portions of the batteries, and the electrode portions of the batteries are inserted in a plurality of through holes, respectively, provided in the base. Connection portions connected to the electrode portions are formed on upper surfaces of the electrode portions of the batteries, a connection terminal for connecting the batteries in parallel is formed in a region on the base in which the connection terminal does not cover at least the plurality of through holes, and the connection terminal is connected to the connection portions for the batteries by fusible links straddling the through holes.

With this configuration, a battery having a problem and connected in parallel can be disconnected to ensure prevention of failure operation, so that it is possible to obtain a battery module which is safe and has high reliability. Moreover, the battery having the problem is safely disconnected, so that the rest of the batteries connected in parallel are effectively used, thereby obtaining a battery module which can be used for a long period of time.

Here, a gap is preferably provided between an outer side surface of each electrode portion and an inner side surface of the corresponding through hole. With this configuration, each fusible link straddling the through hole to connect the connection terminal to the connection portion for the corresponding battery is arranged in the gap (space) between the outer side surface of the electrode portion and the inner side surface of the through hole. Thus, it is possible to reduce dissipation of Joule heat generated when an overcurrent flows in the fusible link. This facilitates the design of the fusible link configured to be blown due to a temperature rise caused by Joule heat, and can reduce design variations. Further, it is possible to reduce a thermal influence of the temperature rise caused by the Joule heat over the other batteries and the connecting terminal.

Moreover, it is preferable that the connection portions, the connection terminal, and the fusible links be monolithically made of the same material. Furthermore, it is preferable that the connection portions, the connection terminal, and the fusible links be substantially flush with each other. With this configuration, it is possible to obtain a battery module which is safe, and has high reliability with a simple configuration.

Alternatively, in another embodiment, a connection terminal is preferably formed in a belt shape having a plurality of openings in positions corresponding to electrode portions of batteries, and each of fusible links is preferably formed between the connection terminal and a connection portion for the corresponding battery while straddling the opening. Alternatively, the connection terminal may be formed in a belt shape on one side relative to the electrode portions of the batteries, and each fusible link may be formed between the connection terminal and the connection portion for the corresponding battery while straddling the through hole. With this configuration, it is possible to obtain a battery module which is safe, and has high reliability with a simple configuration.

Alternatively, in yet another embodiment, it is preferable that a base be made of a flat plate, an electrode portion of each of batteries have an opening portion thorough which gas generated in the battery is released to the outside of the battery, a housing be partitioned by the base into a storage portion in which the plurality of batteries is stored, and an exhaust chamber via which the gas released through the opening portion of the electrode portion is released to the outside of the housing, and the opening portion of the electrode portion be in communication with the exhaust chamber via a through hole formed in the base. With this configuration, the gas released through the opening portion of the electrode portion is released in the exhaust chamber via the through hole, and further released to the outside of the housing. Thus, it is possible to prevent the gas from entering neighboring batteries. As a result, it is possible to obtain a thin, small-size battery module which has substantially the same height as that of the batteries, and has high safety and high reliability.

Here, when the opening portion of the electrode portion is provided at a side surface of the electrode portion, the internal diameter of the through hole is preferably larger at a position of the base which is provided with the connection terminal than at a position of the base which is in contact with the battery case. Alternatively, when the opening portion of the electrode portion is provided at an upper surface of the electrode portion, the connection portion is preferably formed in a region other than the opening portion. With this configuration, the gas released through the opening portion of the electrode portion can efficiently be released in the exhaust chamber via the through hole.

Alternatively, in still another embodiment, multiple ones of the base may independently be provided for batteries. With this configuration, it is possible to easily obtain a battery module having an arbitrary configuration.

A battery pack of an embodiment of the present invention is a battery pack including multiple ones of the battery module of the embodiments, wherein the battery modules are aligned and connected in series and/or in parallel. With this configuration, it is possible to obtain a battery pack having a given voltage and capacity depending on the application.

Embodiments of the present invention will be described below in detail with reference to the drawings. The present invention is not limited to the following embodiments. The embodiments can accordingly be modified without deviating from the effective scope of the present invention, and can be combined with other embodiments. Note that in the embodiments below, a nonaqueous electrolyte secondary battery, e.g., a lithium ion secondary battery, in a cylindrical shape (hereinafter referred to as a "battery") will be described by way of example, but of course, the invention is not limited to these embodiments.

First Embodiment

FIG. 1 is a cross-sectional view of a battery included in a battery module in a first embodiment of the present invention.

As illustrated in FIG. 1, the battery in a cylindrical shape includes an electrode group 4 in which a positive electrode 1 and a negative electrode 2 are wound with a separator 3 interposed therebetween. The positive electrode 1 includes a positive electrode lead 8 made of, for example, aluminum. The negative electrode 2 faces the positive electrode 1. One end of the negative electrode 2 is provided with a negative electrode lead 9 made of, for example, copper. Insulating plates 10a, 10b are installed above and below the electrode group 4, and the electrode group 4 with the insulating plates 10a, 10b is inserted in a battery case 5. The other end of the positive electrode lead 8 is welded to a sealing plate 6. The other end of the negative electrode lead 9 is welded to a bottom of the battery case 5. A nonaqueous electrolyte (not shown) capable of conducting lithium ions is injected in the battery case 5. An opening end of the battery case 5 is crimped to a positive electrode cap 16 included in one electrode portion, a current cutoff member 18 such as a PTC element, and the sealing plate 6 via a gasket 7. The positive electrode 1 includes a positive electrode current collector 1a and a positive electrode layer 1b containing a positive electrode active material.

Here, the positive electrode cap 16 protrudes from an upper surface 5A of the opening end of the battery case 5. A side surface of the positive electrode cap 16 is provided with an opening portion 17 to release gas resulting from opening of a vent mechanism 19 such as a safety valve due to a problem in the electrode group 4. Note that the height of a portion of the positive electrode cap 16 which protrudes from the upper surface 5A is almost the same as the thickness of, for example, a circuit board, which will be described below.

Here, the positive electrode layer 1*b* contains, as the positive electrode active material, for example, a lithium-containing compound oxide such as $LiCoO_2$, $LiNiO_2$, $Li_2MnO_4$, a mixture of these materials, or a complex compound of these materials. The positive electrode layer 1*b* further contains a conductive agent and a binder. Examples of the conductive agent include graphites such as natural graphite and artificial graphite, and carbon blacks such as acetylene black, ketjen black, channel black, furnace black, lamp black, and thermal black. Examples of the binder include PVDF, polytetrafluoroethylene, polyethylene, polypropylene, an aramid resin, polyamide, polyimide, etc.

Moreover, as the positive electrode current collector 1*a* used for the positive electrode 1, aluminum (Al), carbon (C), or a conductive resin can be used.

As the nonaqueous electrolyte, an electrolyte solution obtained by dissolving a solute in an organic solvent, or a so-called polymer electrolyte layer including the electrolyte solution solidified by macromolecules can be used. As the solute of the nonaqueous electrolyte, $LiPF_6$, $LiBF_4$, $LiClO_4$, $LiAlCl_4$, $LiSbF_6$, LiSCN, $LiCF_3SO_3$, $LiN(CF_3CO_2)$, $LiN(CF_3SO_2)_2$, or the like can be used. Furthermore, as the organic solvent, for example, ethylene carbonate (EC), propylene carbonate, butylene carbonate, vinylene carbonate, dimethyl carbonate (DMC), diethyl carbonate, ethyl methyl carbonate (EMC), or the like can be used.

Moreover, a negative electrode current collector 11 of the negative electrode 2 can be metal foil made of stainless steel, nickel, copper, titanium, or the like, or thin film made of carbon or a conductive resin.

Furthermore, as negative electrode layers 15 of the negative electrode 2, a negative electrode active material, e.g., silicon (Si), tin (Sn), or a carbon material such as graphite, which is capable of reversibly inserting and extracting lithium ions, and has a theoretical capacity density of 833 $mAh/cm^3$ or higher can be used.

A battery module of the first embodiment of the present invention will be described in detail below with reference to FIGS. 2A-2C, 3, and 4.

Figure 2:
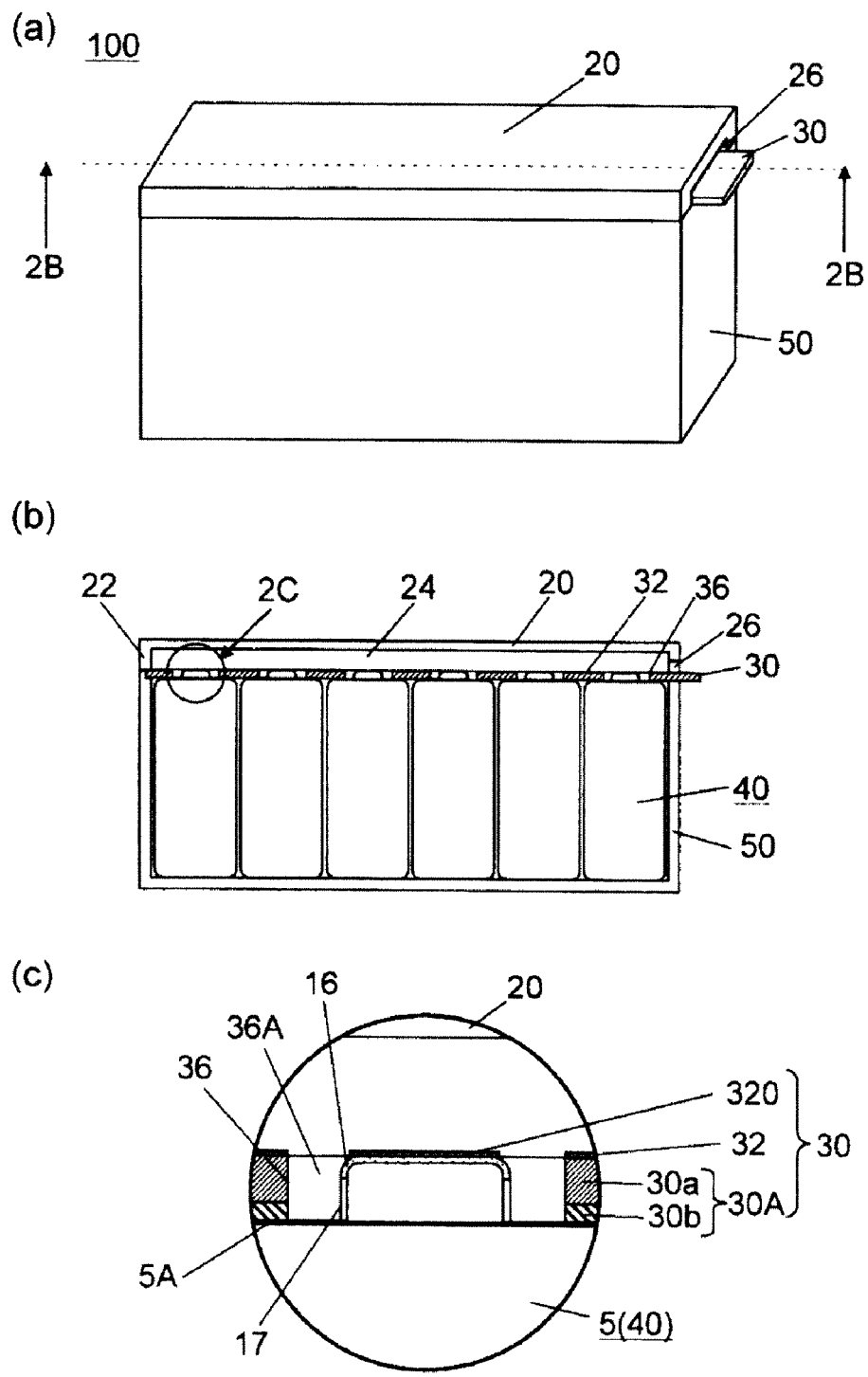
FIG. 2A is a perspective view illustrating the exterior of the battery module of the first embodiment of the present invention.
FIG. 2B is a cross-sectional view along the line 2B-2B of FIG. 2A.
FIG. 2C is an enlarged cross-sectional view of the part 2C of FIG. 2B.
Figure 3:
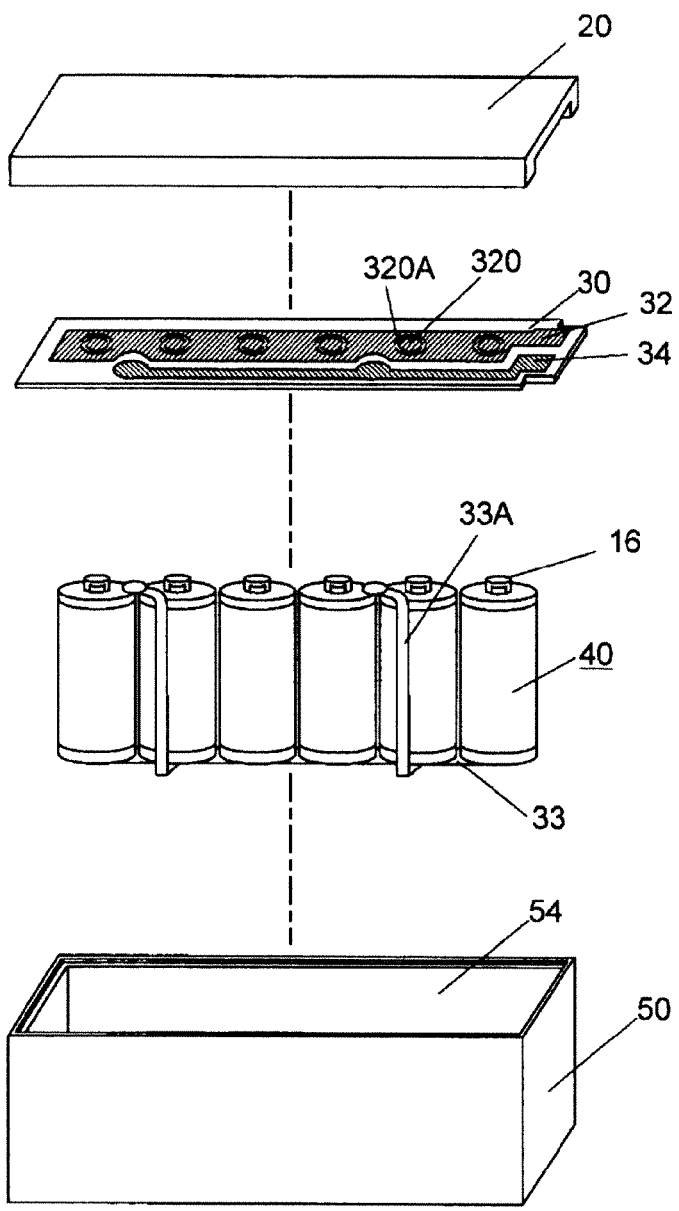
FIG. 3 is an exploded perspective view of the battery module of the first embodiment of the present invention.
Figure 4:
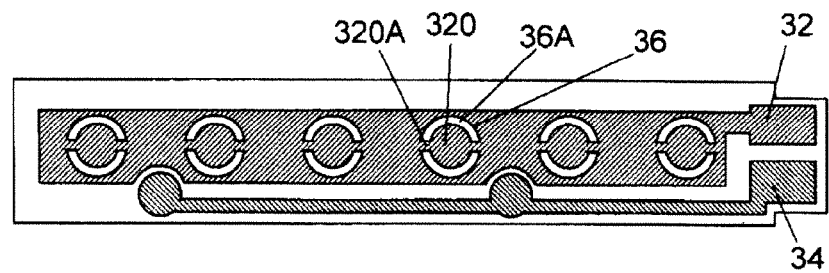
FIG. 4 is a plan view of a circuit board illustrating a fusible link of the battery module of the first embodiment of the present invention.

FIG. 2A is a perspective view illustrating the exterior of the battery module of the first embodiment of the present invention. FIG. 2B is a cross-sectional view along the line 2B-2B of FIG. 2A. FIG. 2C is an enlarged cross-sectional view of the part 2C of FIG. 2B. FIG. 3 is an exploded perspective view of the battery module of the first embodiment of the present invention. FIG. 4 is a plan view of a circuit board illustrating a cutoff mechanism (fusible link) of the battery module of the first embodiment of the present invention. Here, "fusible link" means a connection means having a fuse function allowing a blowout at a current value of a predetermined current, and the specific configuration of the connection means is not particularly limited.

As illustrated in FIGS. 2A and 3, a battery module 100 includes a housing 50 made of an insulating resin material such as a polycarbonate resin, and a lid body 20 fitting into the housing 50.

As illustrated in FIGS. 2B and 3, a battery block is stored in the housing 50. The battery block is formed in such a manner that a plurality of batteries 40 whose positive electrode caps 16 are aligned in the same direction is electrically connected in parallel by a connection terminal 32 of a circuit board 30, the connection terminal 32 including fusible links. Moreover, a connection plate 33 by which bottoms serving as the other electrode portions (negative electrodes) of the batteries are connected in parallel is connected to a connection terminal 34 of the circuit board 30 by extension portions 33A each extending from a part of the connection plate 33.

Moreover, as illustrated in FIG. 2C, the positive electrode caps 16 protruding from the battery cases 5 are inserted inside through holes 36 in the circuit board 30, where the through holes 36 are provided for the batteries, respectively. The connection terminal 32 of the circuit board 30 is connected to connection portions 320 via the fusible links (not shown). Here, the circuit board 30 is in contact with and closely attached to the battery cases 5, and each through hole 36 has a gap 36A so that the opening portion 17 provided in the side surface of the positive electrode cap 16 is not covered.

That is, the battery module of the present embodiment is a battery module including the plurality of batteries 40 aligned and stored in the housing 50, where the batteries 40 include the electrode portions 16 protruding from the battery cases 5, and a base 30A is arranged on a side of the electrode portions 16 of the batteries 40. Specifically, the base 30A of the circuit board 30 is arranged in contact with the battery cases 5 around the electrode portions 16. The electrode portions 16 of the batteries 40 are inserted in the plurality of through holes 36, respectively, provided in the base 30A. The connection portions 320 connected to the electrode portions 16 are formed on upper surfaces of the electrode portions 16 of the batteries 40. The connection terminal 32 for connecting the batteries 40 in parallel is formed in a region of the base 30A in which the connection terminal 32 does not cover at least the plurality of through holes 36. The connection terminal 32 is connected to the connection portions 320 for the batteries 40 by fusible links 320A straddling the through holes 36. Moreover, a gap 36A is provided between an outer side surface of each electrode portion 16 and an inner side surface of the corresponding through hole 36.

Figure 20:
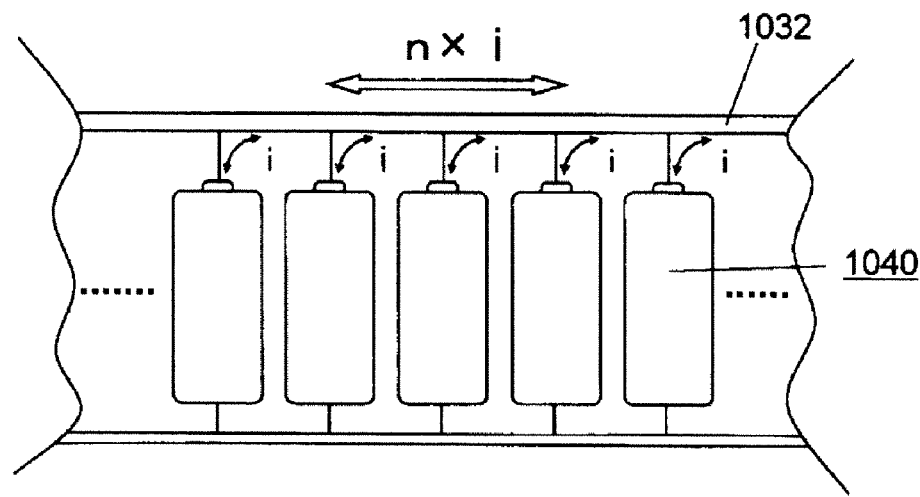
FIG. 20A is a schematic view illustrating normal operation of a battery module including batteries connected in parallel.
FIG. 20B is a schematic view illustrating operation of the battery module in which an internal short-circuit occurs in one of the batteries connected in parallel.
Figure 20:
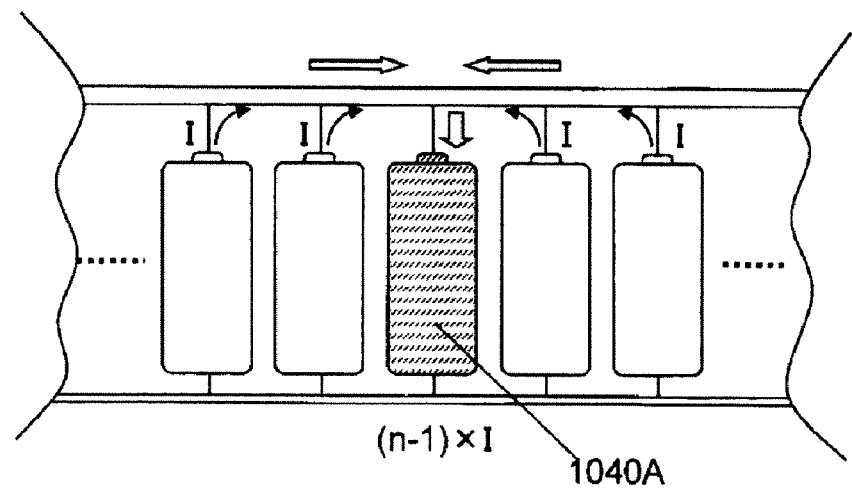

Specifically, as illustrated in FIG. 4, the connection portions 320 connected to the positive electrode caps 16 of the batteries are connected to the connection terminal 32 by the fusible links 320A each including a bridge portion covering a part of the position of the gap 36A of the through hole 36. Here, each fusible link 320A is formed to be broken by, for example, blowing at a value greater than or equal to a predetermined value of a current which flows on the occurrence of an internal short-circuit in its corresponding battery. The specific form of the fusible link 320A is, as illustrated in FIG. 20B, designed in consideration of materials and the cross-ssectional area with respect to the value of a current which flows on the occurrence of an internal short-circuit in its corresponding battery. Here, since the fusible link 320A is not supported by the circuit board 30, but is provided to bridge the position of the gap 36A, it is possible to reduce variations in time period required for blowing, the variations being caused by conduction of Joule heat for blowing the fusible link 320A to the circuit board 30. As a result, it is possible to ensure that a battery having a problem and connected in parallel is disconnected in a short period of time.

Moreover, the gap 36A between the through hole 36 of the circuit board 30 and the positive electrode cap 16 also serves as space in which gas discharged from the opening portion 17 of the positive electrode cap 16 on the occurrence of a problem in the battery is released. Then, as illustrated in FIGS. 2B and 3, the discharged gas passes through the gap 36A between the connection terminal 32 of the circuit board 30 and the through hole 36, and through space in an exhaust chamber 24 of the lid body 20, and then is released from an opening 26 in communication with the outside.

Components included in the battery module 100 will be described below with reference to the drawings.

First, as illustrated in FIG. 3, the housing 50 includes an opening end on a side on which the lid body 20 is fitted into the housing 50, and a storage portion 54 into which the batteries 40 are installed from the opening end side. Here, when batteries each have, for example, an outer diameter of 18 mm, and a height of 65 mm, the height of the storage portion 54 is approximately a value obtained by adding the thickness of the connection plate 33 to 65 mm.

Moreover, as illustrated in FIGS. 2B and 3, the lid body 20 includes the exhaust chamber 24 formed by external walls 22, and the opening 26 provided in a part of the external walls 22.

Moreover, as illustrated in FIG. 2C, the base 30A of the circuit board 30 has a layered structure including at least two layers, a heat-resistant member 30a made of, for example, a glass and epoxy substrate or polyimide, and an elastic member 30b having, for example, rubber elasticity. Since the elastic member 30b elastically deforms and comes closely in contact with the upper surfaces 5A of the battery cases 5, a high degree of air-tightness can be ensured. Note that as long as a high degree of air-tightness can be ensured, it is not particularly necessary for the base 30A of the circuit board 30 to have the layered structure. Moreover, the circuit board 30 includes the connection terminal 32 which is to be connected to the positive electrode caps 16 of the batteries inserted in the through holes 36, and the connection terminal 34 which is to be connected to the extension portions 33A of the connection plate 33 connecting the other electrodes of the batteries (e.g., negative electrodes) in parallel. The connection terminal 32 is provided such that the connection terminal 32 does not completely cover the through holes 36. Note that the connection terminal 32, the connection portions 320, and the connection plate 33 are made of, for example, a nickel plate or lead wire, and the connection plate 33 is connected to the connection terminal 34 made of copper foil, or the like by, for example, soldering. Moreover, connection of the positive electrode caps 16 to the connection portions 320 of the connection terminal 32, and connection of the negative electrodes to the connection plate 33 are achieved by, for example, electric welding or spot welding.

In this way, battery modules can be connected by the circuit board, so that it is possible to significantly reduce space required for routing a power supply interconnect or a control interconnect. Moreover, the opening portions of the positive electrode caps of the batteries are placed in the through holes in the circuit board. As a result, gas discharged from a battery in a fault state cannot enter neighboring batteries, and thus even if the gas is ignited to burn, flames can be prevented from entering the neighboring batteries, and blocking the effect of the flames can be ensured.

According to the present embodiment, a battery having a problem and connected in parallel is disconnected by a fusible link in order to ensure the prevention of a failure mode, so that it is possible to obtain a battery module which is safe and has high reliability. Moreover, by safely disconnecting the battery having the problem, the other batteries connected in parallel are effectively used, thereby obtaining a battery module which can be used for a long period of time.

Moreover, according to the present embodiment, the battery module is stored in the storage portion of the housing, under a sealed state by at least the circuit board and the housing, and gas discharged from a battery having a problem can be released, in a gaseous state, to the outside of the battery module through the gap of the through hole of the circuit board. As a result, it is possible to obtain a battery module in which the gas is not ignited to burn or to generate smoke, and which is highly safe.

Moreover, according to the present embodiment, the battery module can be stored in the storage portion of the housing, under the sealed state by at least the circuit board and the housing, so that it is not necessary to individually store the batteries. As a result, the battery module can be downsized. Moreover, space required for routing the power supply interconnect or the control interconnect can significantly be reduced by the circuit board. As a result, it is possible to obtain a battery module which is smaller in size, and has high safety and high reliability.

Figure 5:
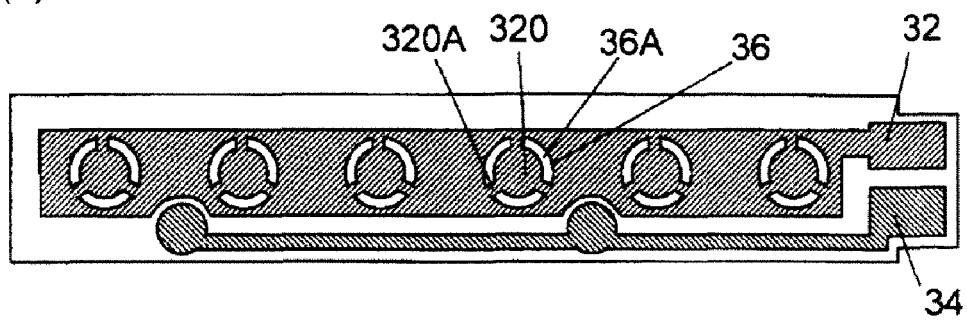
FIG. 5A is a plan view illustrating another example, a first example, of the fusible link of the battery module of the first embodiment of the present invention.
FIG. 5B is a plan view illustrating yet another example, a second example, of the fusible link of the battery module of the first embodiment of the present invention.
FIG. 5C is a plan view illustrating still another example of the fusible link of the battery module of the first embodiment of the present invention.
Figure 5:
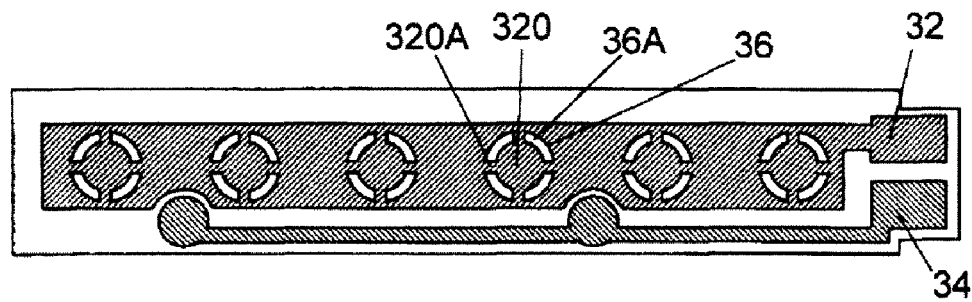
Figure 5:
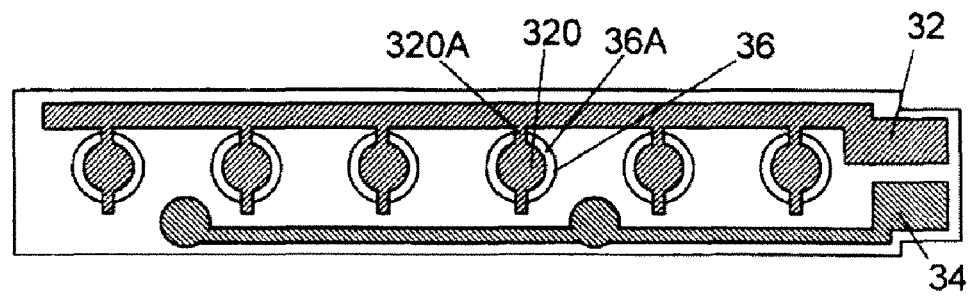

Note that in the present embodiment, bridge portions connecting the connection portion 320 to the connection terminal 32 which are provided as fusible links in two directions have been described by way of example, but the present invention is not limited to this embodiment. For example, as illustrated in FIGS. 5A and 5B, bridge portions serving as fusible links 320A may be provided in three directions or four directions. Alternatively, as illustrated in FIG. 5C, the connection terminal 32 can be connected to the connection portion 320 by a bridge portion serving as a fusible link 320A provided in one direction. In this case, the form of the bridge portion serving as the fusible link 320A is preferably designed such that the bridge portion is blown at a value greater than or equal to a predetermined value of a current depending on the number of the bridge portions. With this configuration, depending on the number of batteries connected in parallel, arbitrary fusible links can be obtained in consideration of the processibility and the productivity of the bridge portions. Moreover, in particular in the case of FIG. 5C, only one bridge portion may be blown, so that it is possible to ensure that a battery having a problem can be disconnected in a shorter period of time.

Here, the configuration of the connection terminal 32 is not particularly limited in the present embodiment, but as illustrated in, for example, FIGS. 5A and 5B, the connection terminal 32 may be formed in a belt shape having a plurality of openings in positions corresponding to the electrode portions 16 of the batteries 40, and the fusible links 320A may be formed between the connection terminal 32 and the connection portions 320 for the batteries 40 with the fusible links 320A straddling the openings. Here, the internal diameter of each opening of the connection terminal 32 may substantially be the same as that of each through hole 36 of the base 30A. Alternatively, as illustrated in FIG. 5C, the connection terminal 32 may be formed in a belt shape on one side relative to the electrode portions 16 of the batteries 40, and the fusible links 320A may be formed between the connection terminal 32 and the connection portions 320 for the batteries 40 with the fusible links 320A straddling the through holes 36.

Moreover, in the present embodiment, the lid body 20 made of an insulating material such as a polycarbonate resin has been described, but the invention is not limited to this embodiment. For example, a metal material such as aluminum covered with an insulating resin may be used. With this configuration, the mechanical strength can be improved to obtain a lid body having a reduced thickness, thereby further downsizing the battery module. Moreover, high thermal-conductivity of the metal material enhances the capability of cooling discharged gas, so that it is also possible to obtain a highly reliable battery module which is less likely to be ignited.

Figure 6:
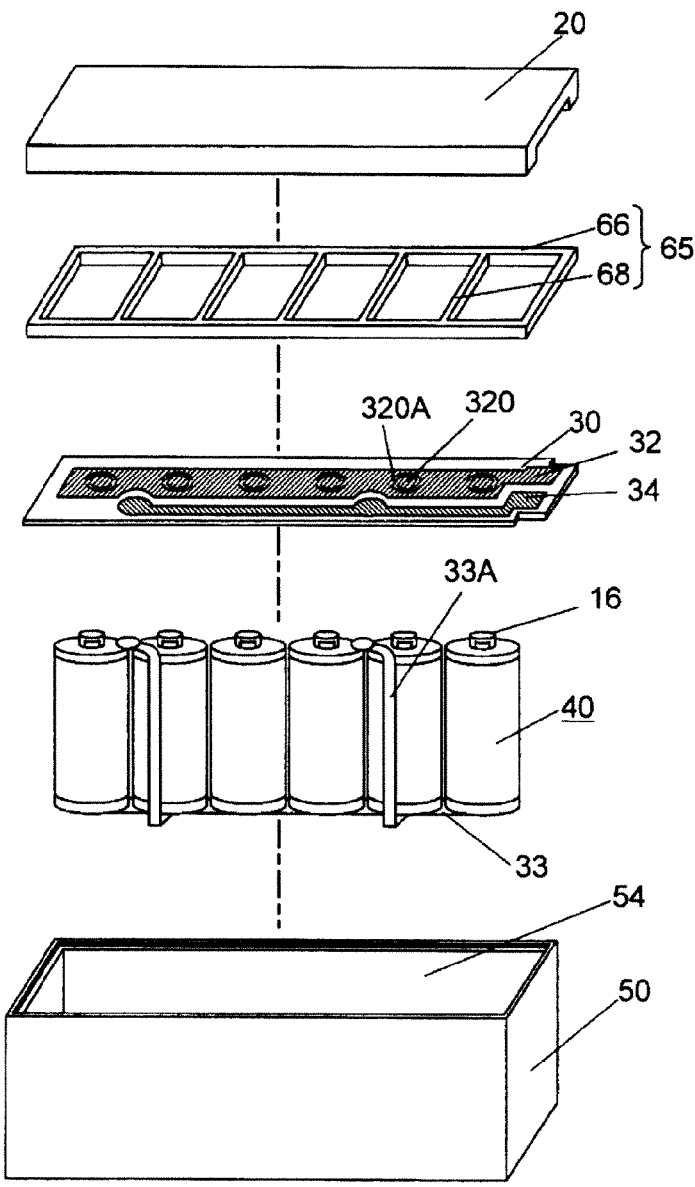
FIG. 6 is an exploded perspective view illustrating another example of the battery module of the first embodiment of the present invention.

Moreover, in the present embodiment, a structure in which the lid body 20 is fitted into the housing 50 to support the circuit board 30 by the external walls 22 of the lid body 20, the housing 50, and the upper surfaces 5A of the battery cases 5 has been described, but the present invention is not limited to this embodiment. For example, as illustrated in FIG. 6 which is an exploded perspective view of a battery module, a supporting member 65 configured to support the circuit board 30 may be interposed between the lid body 20 and the circuit board 30. In this case, the supporting member 65 includes an external frame 66 for supporting at least an external circumferential portion of the circuit board 30, and supporting portions 68. The supporting portions 68 are provided in positions facing the housing 50, and facing positions at which the upper surfaces 5A of the battery cases 5 are in contact with each other. Here, when the space of the exhaust chamber of the lid body 20 is reduced due to the supporting portions 68 of the supporting member 65, a recessed portion, a hole, or the like which is in communication with the opening of the lid body 20 may be provided in part of the supporting portion 68. In this way, it is possible to ensure fixing of the circuit board 30 by the housing 50, the upper surfaces 5A of the battery cases 5, and the supporting portions 68 of the supporting member 65. As a result, deformation of the circuit board due to pressure caused by discharged gas is reduced, and heat or gas entering neighboring batteries is more efficiently reduced, so that it is possible to obtain a battery module having further improved reliability and safety.

Figure 7:
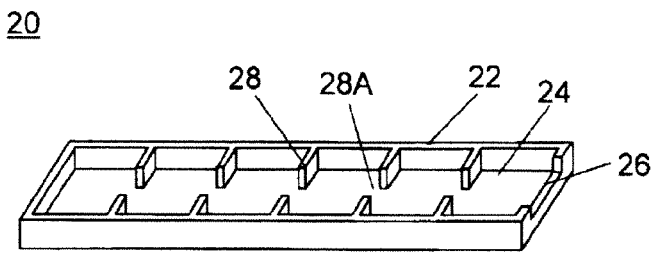
FIG. 7 is an exploded perspective view illustrating another example of a lid body of the first embodiment of the present invention.

Moreover, in the exhaust chamber 24 of the lid body 20, rib portions 28 each having an opening hole 28A may be provided in positions facing the housing 50 and the upper surfaces 5A of the battery cases 5 as illustrated in FIG. 7, instead of providing the supporting member 65. In this way, the circuit board 30 can be fixed by the housing, the upper surfaces 5A of the battery cases 5, and rib portions 28 of the lid body 20, and the size or the thickness of the battery module can further be reduced.

Moreover, in the present embodiment, the circuit board provided with the power supply interconnect such as the connection terminal has been described by way of example, but the present invention is not limited to this embodiment. For example, the circuit board may be provided with voltage detecting interconnects for detecting voltages of battery modules, or temperature sensing interconnects for sensing temperatures of the battery modules. Here, temperature sensing devices such as thermistors are connected to the temperature sensing interconnects, and the temperature sensing devices are brought into contact with the battery modules, so that the sensing devices can sense the temperatures of the battery modules. In this way, the voltages and the temperatures of the plurality of battery modules can individually be detected and controlled. As a result, control is possible in consideration of, for example, variations of the characteristics or aging variation of the battery modules, so that it is possible to further increase reliability and safety. Note that the pattern width of the voltage detecting interconnects or the temperature sensing interconnects on the circuit board can significantly be smaller than that of the power supply interconnect. This is because a high current flows through the power supply interconnect, and thus power loss due to interconnect resistance has to be reduced, whereas the voltage detecting interconnects or the temperature sensing interconnects can perform detection/sensing by a very low current. Thus, the power supply interconnect and pairs of the voltage detecting interconnects and the temperature sensing interconnects can efficiently be arranged on the circuit board, so that space required for interconnection can significantly be reduced.

Figure 8:
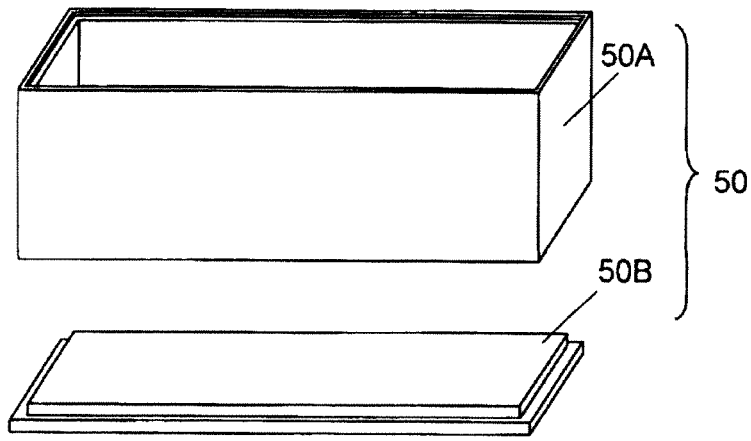
FIG. 8 is an exploded perspective view illustrating another example of a housing of the first embodiment of the present invention.
Figure 9:
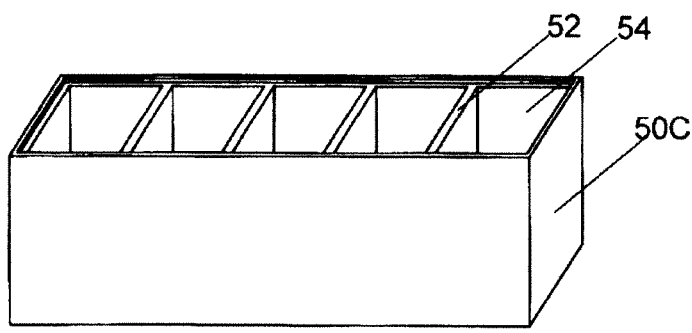
FIG. 9 is an exploded perspective view illustrating yet another example of the housing of the first embodiment of the present invention.

Moreover, in the present embodiment, the housing having an opening end on its one side has been described by way of example, but the present invention is not limited to this embodiment. For example, as illustrated in FIG. 8, a housing 50 may include a frame body 50A and a closing member 50B. The frame body 50A has opening ends on both ends thereof to store a battery module. The closing member 50B closes one of the opening ends. With this configuration, assembly properties and workability such as connection of the battery module to the connection portion of the circuit board or to the connection plate are improved, thereby obtaining a battery module having high productivity. Alternatively, a frame body 50C having a partition portion 52 for individually storing batteries as illustrated in FIG. 9 can be used instead of the frame body 50A of FIG. 8. With this configuration, transmission or dissipation of excessive heat generated in a battery having a problem to neighboring batteries can further be reduced by the partition portion 52. Thus, it is possible to obtain a battery module having higher reliability and higher safety.

Figure 10:
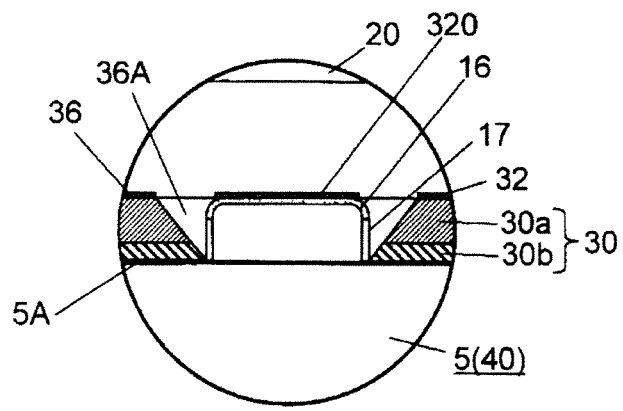
FIG. 10 is an enlarged cross-sectional view of a part illustrating another example of the circuit board of the first embodiment of the present invention.

Moreover, in the present embodiment, the case where the shape of the through hole formed in the circuit board is the same in the thickness direction has been described by way of example, but the present invention is not limited to this embodiment. For example, as illustrated in FIG. 10, the size of the through hole can be smaller at a position of the base closely in contact with the upper surface of the battery case than at a position of the base close to the connection terminal 32. With this configuration, the release efficiency of gas discharged from the opening portion of the positive electrode cap of the battery can be increased (the release resistance can be reduced). Furthermore, the area where the base is closely in contact with the upper surface of the battery case is increased to significantly reduce gas entering the battery case side, so that reliability and safety can be improved.

Moreover, in the present embodiment, materials for the connection portions 320, the connection terminal 32, and the fusible links 320A are preferably but not limited to the same material to monolithically form these members 320, 32, and 320A. Moreover, the thickness of the base 30A and the height of the protruding portion of the electrode portion may substantially be the same so that the connection portion, the connection terminal, and the fusible link are flush with each other. In this way, a battery module which is safe and has high reliability can be obtained with a simple configuration.

Second Embodiment

Figure 11:
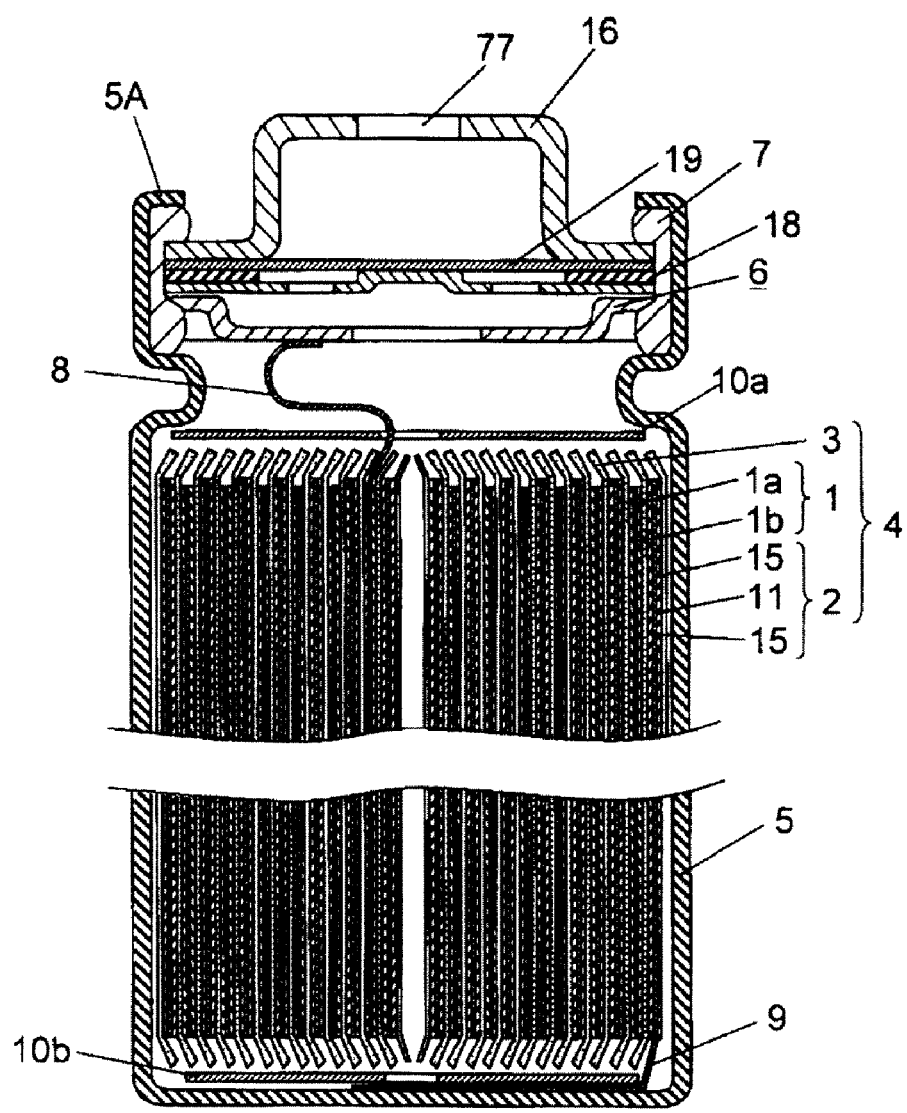
FIG. 11 is a cross-sectional view of a battery included in a battery of a second embodiment of the present invention.

FIG. 11 is a cross-sectional view of a battery included in a battery module of a second embodiment of the present invention.

As illustrated in FIG. 11, the battery module of the present embodiment is different from the battery module of the first embodiment in that an upper surface of a positive electrode cap 16 serving as an electrode portion of the battery is provided with an opening portion 77. Note that components other than batteries are the same as those of the first embodiment, and thus the description thereof may be omitted.

The battery module including the batteries of the present embodiment will be described in detail below with reference to FIGS. 12A-12C, and 13.

Figure 12:
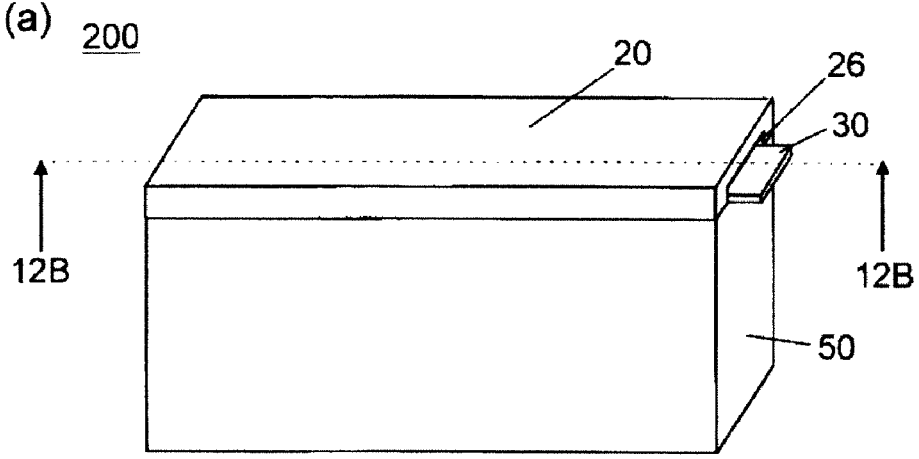
FIG. 12A is a perspective view illustrating the exterior of the battery module of the second embodiment of the present invention.
FIG. 12B is a cross-sectional view along the line 12b-12B of FIG. 12A.
FIG. 12C is an enlarged cross-sectional view of the part 12C of FIG. 12B.
Figure 12:
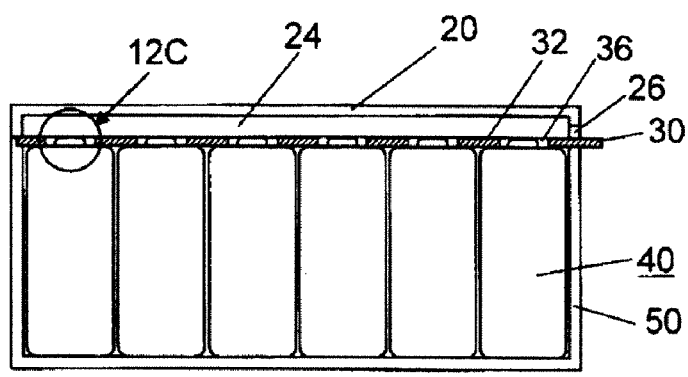
Figure 12:
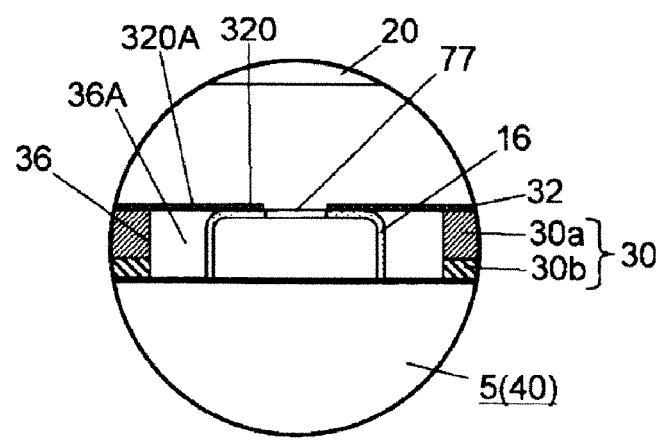
Figure 13:
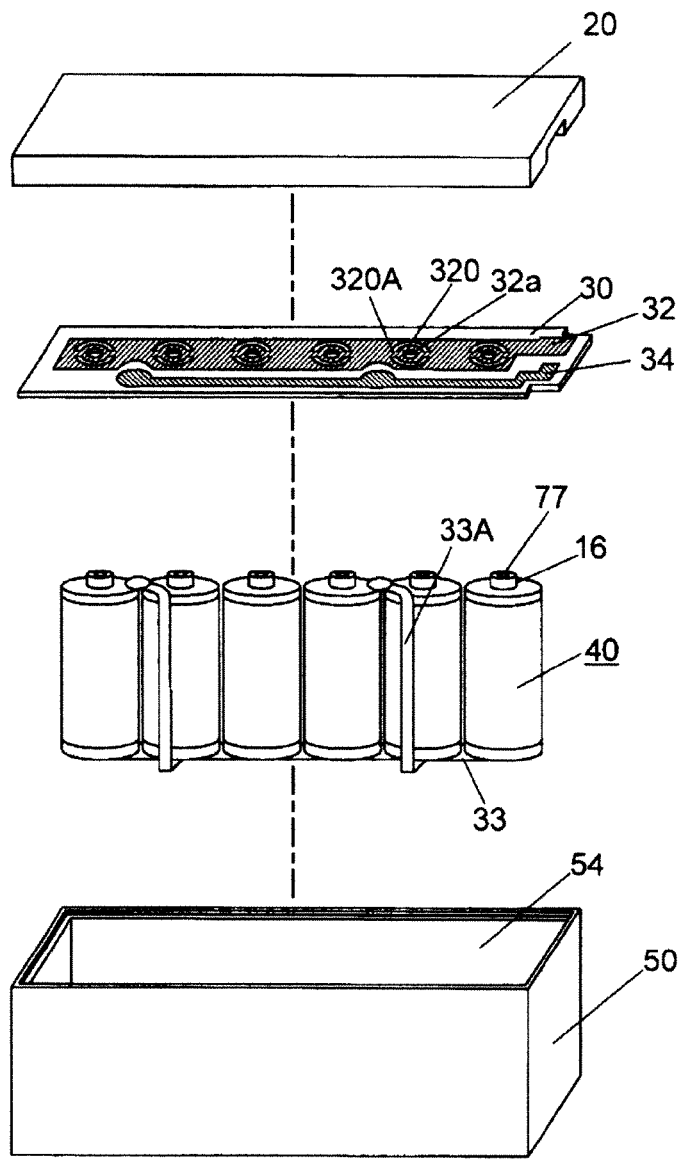
FIG. 13 is an exploded perspective view of the battery module of the second embodiment of the present invention.

FIG. 12A is a perspective view illustrating the exterior of the battery module of the second embodiment of the present invention. FIG. 12B is a cross-sectional view along the line 12B-12B of FIG. 12A. FIG. 12C is an enlarged cross-sectional view of the part 12C of FIG. 12B. FIG. 13 is an exploded perspective view of the battery module of the second embodiment of the present invention.

As illustrated in FIGS. 12A and 13, a battery module 200 includes a housing 50 made of an insulating resin material, and a lid body 20 fitting into the housing 50.

As illustrated in FIGS. 12B and 13, a battery block is stored in a storage portion 54 of the housing 50. The battery block is formed in such a manner that a plurality of batteries 40 whose positive electrode caps are aligned in the same direction is electrically connected in parallel by a connection terminal 32 of a circuit board 30, the connection terminal 32 including fusible links. Moreover, a connection plate 33 by which bottoms each serving as one electrode portion (the negative electrode) of the battery are connected in parallel is connected to a connection terminal 34 of the circuit board 30 by extension portions 33A each extending from a part of the connection plate 33.

Moreover, as illustrated in FIG. 12C, the positive electrode caps 16 protruding from battery cases 5 are inserted inside through holes 36 in the circuit board 30, where the through holes 36 are provided for the batteries, respectively. The connection terminal 32 of the circuit board 30 is connected to connection portions 320 via fusible links 320A. The circuit board 30 is in contact with and closely attached to the battery cases 5, and each through hole 36 has a gap 36A between its inner side surface and the positive electrode cap 16. Here, each connection portion 320 of the connection terminal 32 has a through hole 32a in a position corresponding to the opening portion 77 so that the opening portion 77 formed in the upper surface of the positive electrode cap 16 is not covered.

With this configuration, the opening portion of the positive electrode cap of each battery is directly in communication with an exhaust chamber 24 of the lid body 20 via the through hole 32a of the connection terminal 32. Therefore, gas discharged from a battery in a failure state is not directly discharged to the circuit board 30, and thus deformation of the circuit board 30 can significantly be reduced. As a result, even if the gas is ignited to burn, it is possible to significantly reduce the gas and flames entering neighboring batteries.

Figure 14:
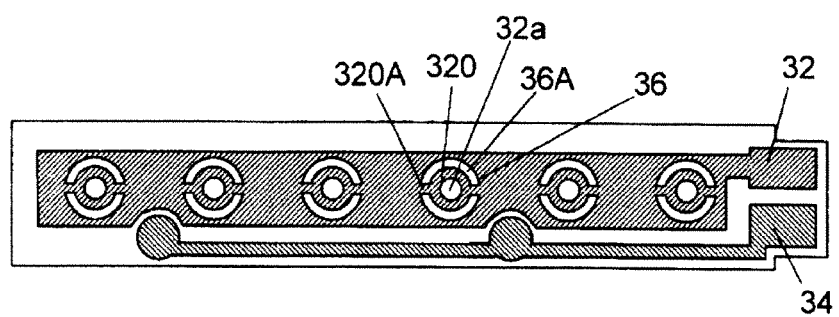
FIG. 14 is a plan view of a circuit board illustrating a fusible link of the battery module of the second embodiment of the present invention.

Specifically, as illustrated in FIG. 14, the connection portions 320 connected to the positive electrode caps 16 of the batteries are connected to the connection terminal 32 by the fusible links 320A each including a bridge portion covering a part of the position of the gap 36A of the through hole 36. Here, each fusible link 320A is formed to be broken by, for example, blowing at a value greater than or equal to a predetermined value of a current which flows on the occurrence of an internal short-circuit in its corresponding battery. The specific form of the fusible link 320A is, as illustrated in FIG. 20B, designed in consideration of materials and the cross-sectional area with respect to the value of a current which flows on the occurrence of an internal short-circuit in its corresponding battery. Here, since the fusible link 320A is not supported by the circuit board 30, but is provided to bridge the position of the gap 36A, it is possible to reduce variations in time period required for blowing, the variations being caused by conduction of Joule heat for blowing the fusible link 320A to the circuit board 30. As a result, it is possible to ensure that a battery having a problem and connected in parallel is disconnected in a short period of time.

According to the present embodiment, a battery having a problem and connected in parallel is disconnected by a fusible link to ensure the prevention of failure operation, so that it is possible to obtain a battery module which is safe and has high reliability. Moreover, by safely disconnecting the battery having the problem, the other batteries connected in parallel are effectively used, thereby obtaining a battery module which can be used for a long period of time.

Moreover, according to the present embodiment, the battery module is stored in the storage portion of the housing under a sealed state by at least the circuit board and the housing, and gas discharged from a battery having a problem can be released, in a gaseous state, to the outside of the battery module via the through hole formed in the connection portion of the connection terminal of the circuit board through the exhaust chamber of the lid body. As a result, it is possible to obtain a battery module which has high safety and in which the gas is not ignited to burn or to generate smoke.

Figure 15:
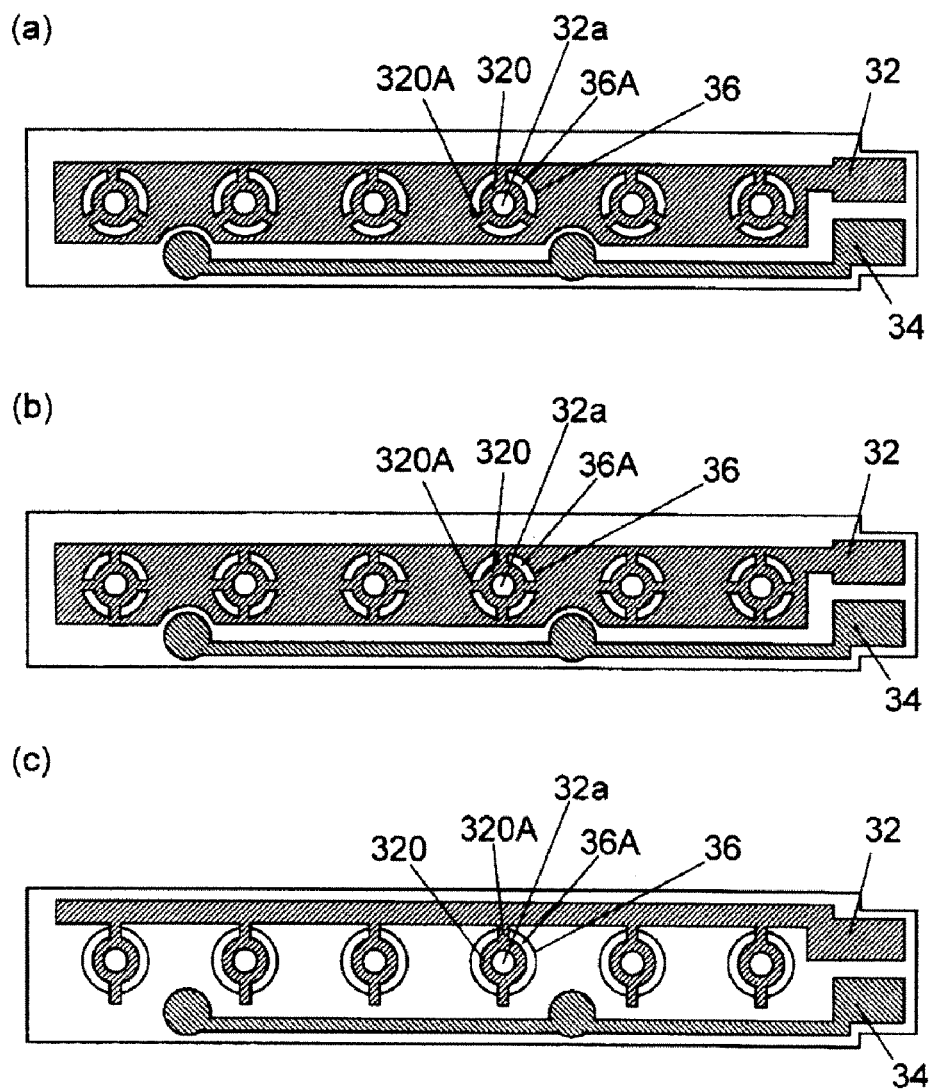
FIG. 15A is a plan view illustrating another example, a first example, of the fusible link of the battery module of the second embodiment of the present invention.
FIG. 15B is a plan view illustrating yet another example, a second example, of the fusible link of the battery module of the second embodiment of the present invention.
FIG. 15C is a plan view illustrating still another example of the fusible link of the battery module of the second embodiment of the present invention.

Note that in the present embodiment, bridge portions connecting the connection portion 320 to the connection terminal 32 which are provided as fusible links 320A in two directions have been described by way of example, but the present invention is not limited to this embodiment. For example, as illustrated in FIGS. 15A and 15B, bridge portions serving as fusible links 320A may be provided in three directions or four directions. Alternatively, as illustrated in FIG. 15C, the connection terminal can be connected to the connection portion by a bridge portion serving as a fusible link 320A provided in one direction. In this case, the form of the bridge portion serving as the fusible link 320A is preferably designed such that the bridge portion is blown at a value greater than or equal to a predetermined value of a current depending on the number of the bridge portions. With this configuration, depending on the number of batteries connected in parallel, arbitrary fusible links can be obtained in consideration of the processibility and the productivity of the bridge portions. Moreover, in particular in the case of FIG. 15C, only one bridge portion may be blown, so that it is possible to ensure that a battery having a problem can be disconnected in a shorter period of time.

Moreover, it is, of course, possible to apply the configuration described in the first embodiment with reference to FIGS. 6-10 to the battery module of the second embodiment, and similar advantages can be obtained.

Third Embodiment

A battery pack of the third embodiment of the present invention will be described in detail below with reference to FIGS. 16A and 16B.

Figure 16:
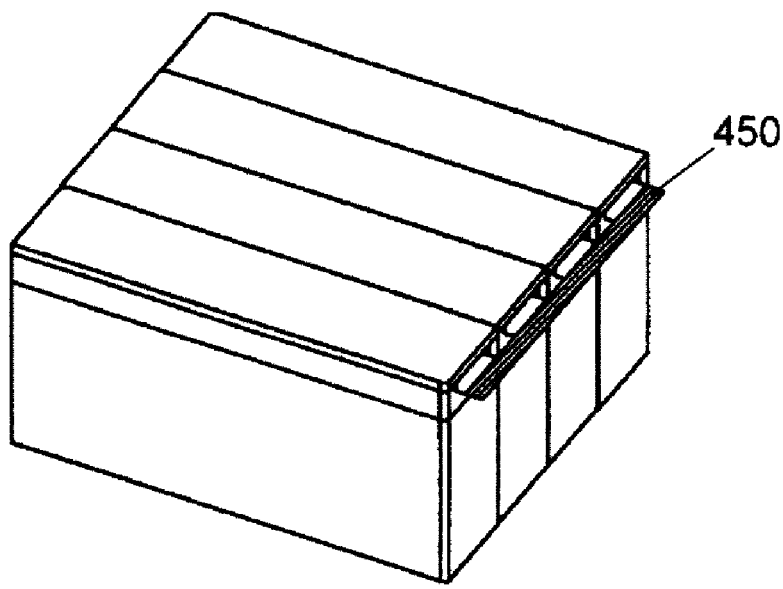
FIG. 16A is an assembled perspective view of a battery pack of a third embodiment of the present invention.
FIG. 16B is an assembled perspective view of another example of the battery pack of the third embodiment of the present invention.
Figure 16:
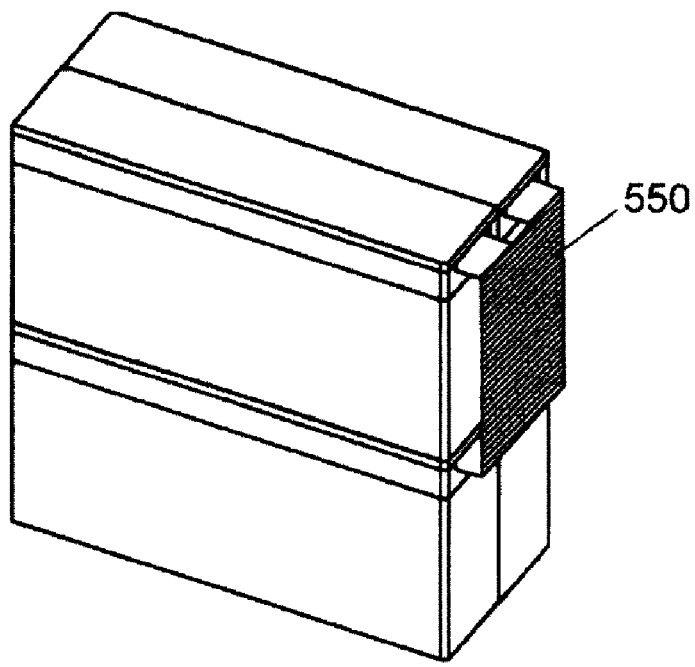

FIGS. 16A and 16B are assembled perspective views of the battery pack of the third embodiment of the present invention.

In FIG. 16A, four battery modules of the above embodiments are arranged in parallel, and are connected by a connection member 450, thereby forming a battery pack 400. Alternatively, in FIG. 16B, battery modules of the above embodiments are parallelly arranged in pairs, the obtained two pairs of the battery modules are stacked in two tiers in the vertical direction, and are connected by a connection member 550, thereby forming a battery pack 500. Here, the battery modules are connected by the connection member, in parallel, in series, or in parallel and in series, thereby forming the battery pack.

According to the present embodiment, highly versatile battery packs having a required voltage and electric capacity can easily be obtained by arbitrarily combining battery modules in consideration of installation space depending on the application.

Moreover, according to the present embodiment, as in the above embodiments, even when a problem such as an internal short-circuit occurs in a battery of any one of the battery modules, safe disconnection of the battery having the problem is ensured by the fusible link provided at the connection terminal, and the rest of the batteries connected in parallel are effectively used, thereby obtaining a battery module which can be used for a long period of time.

Moreover, according to the present embodiment, even when the fusible link does not perform its function, and thus excessive heat is generated in the battery due to a current flowing in the battery having the problem to discharge gas from the opening portion of the positive electrode cap, the gas is not ignited, and can be released, in a gaseous state, to the outside via the exhaust chamber of the lid body. As a result, explosive expansion due to ignition of gas is not caused. Thus, it is possible to obtain a battery pack in which no battery module ruptures, and which is safe and has high reliability.

Other Embodiments

Other embodiments of the battery module of the present invention will be described below with reference to FIG. 17.

Figure 17:
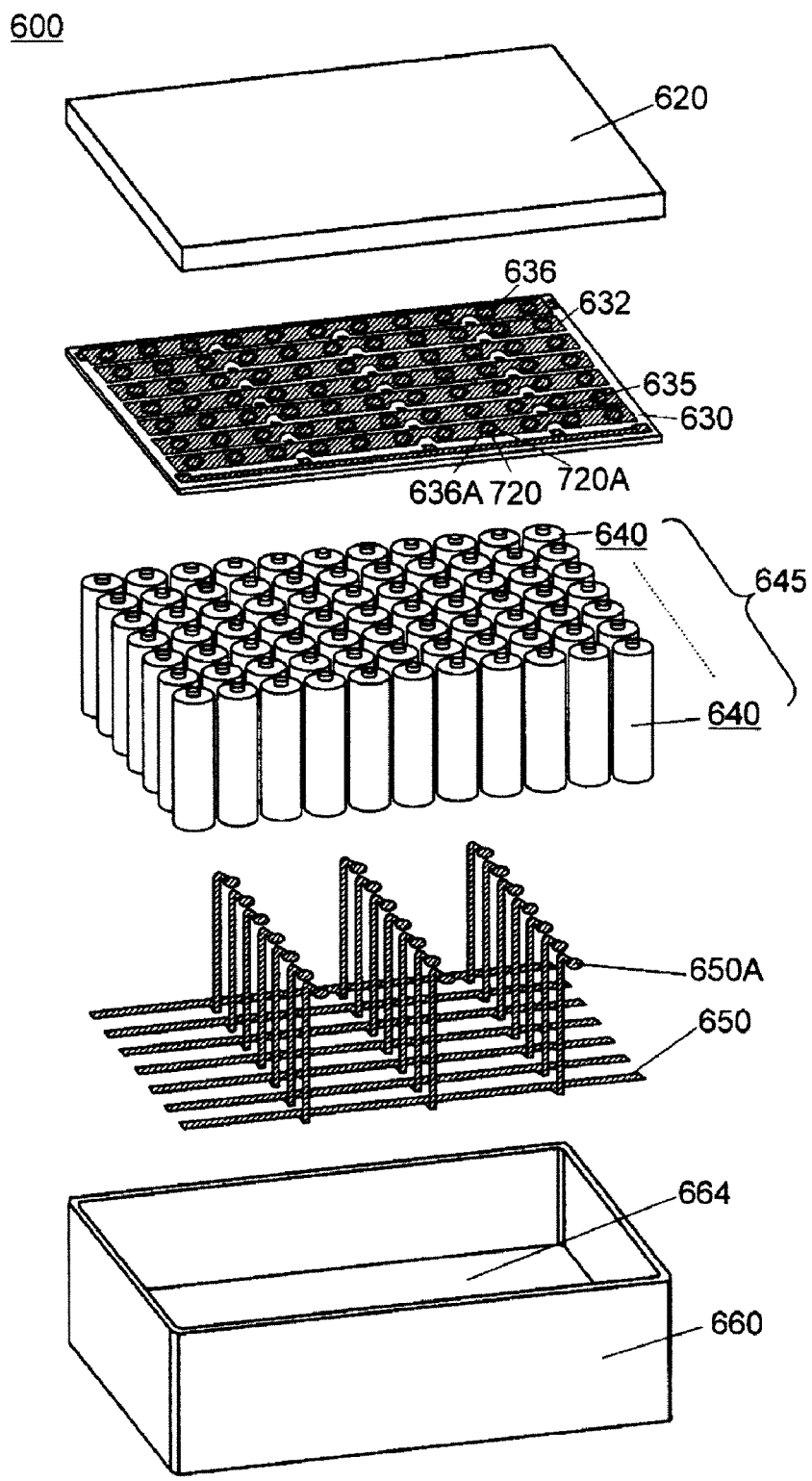
FIG. 17 is an exploded perspective view illustrating a battery module of another embodiment of the present invention.

FIG. 17 is an exploded perspective view illustrating a battery module 600 of another embodiment of the present invention. Here, the battery module 600 is different from those of the first and second embodiments in that a plurality of battery assemblies 640 each including batteries connected in parallel is two-dimensionally arranged, is connected in series, and is integrally stored. Note that in FIG. 17, the battery module 600 will be described by way of example, where the battery module 600 includes seven battery assemblies 640 connected in series, and each battery assembly 640 includes eleven batteries connected in parallel. For example, when lithium ion batteries each having a capacity of 2500 mAh and an average voltage 3.6 V are used, a battery assembly set 645 having a voltage of 25.2 V (3.6 V×7) and a capacity of 27.5 Ah (2.5 Ah×11) is obtained.

That is, as illustrated in FIG. 17, the battery module 600 includes a housing 660 having a storage portion 664, the battery assembly set 645 which is stored in the storage portion 664, and in which seven battery assemblies each including eleven batteries connected in parallel are connected in series, a circuit board 630 and connection plates 650 by which the battery assemblies 640 are connected in series, and a lid body 620 fitting into the housing 660 in which these members are stored under a sealed state.

The circuit board 630 includes through holes 636 in positions corresponding to positive electrode caps of the batteries of the battery assembly set 645. The circuit board 630 is provided with connection terminals 632 such that the connection terminals 632 do not completely cover the through holes 636. The connection terminals 632 connect the battery assemblies 640 in parallel, and include connection portions 720. Here, as in the above embodiments, each connection portion 720 connected to the positive electrode cap 16 of the battery is connected to the connection terminal 632 via a fusible link 720A made of a bridge portion covering a part of the position of a gap 636A of the through hole 636. The circuit board 630 is, as in the above embodiments, arranged closely in contact with upper surfaces of battery cases.

Moreover, each connection plate 650 parallelly connects negative electrodes each serving as one of electrode portions of the battery of the battery assembly 640, and is connected to connection rand portions 635 of the circuit board 630 via extension portions 650A provided at portions of the connection plate 650. The connection rand portions 635 are connected to the connection terminal 632 of a neighboring battery assembly 640, thereby connecting the battery assemblies 640 in series.

Moreover, the lid body 620 includes an opening (not shown) to release discharged gas via an exhaust chamber (not shown) to the outside. Here, the opening may include openings provided for the battery assemblies 640, respectively, or one opening may be provided for all the battery assemblies 640.

According to the above embodiments, it is possible to obtain advantages similar to those of the first and second embodiments, and to obtain a battery module which is further downsized by integrally forming the housing.

Note that in the above embodiments, the base of the circuit board having the plurality of thorough holes corresponding to the positive electrode caps of the plurality of batteries connected in parallel has been described by way of example, but the present invention is not limited to this embodiment. For example, as illustrated in FIGS. 18A, 18B, 19A, and 19B, the base of the circuit board may be made of fixing members corresponding to the batteries on a one-to-one basis.

Figure 18:
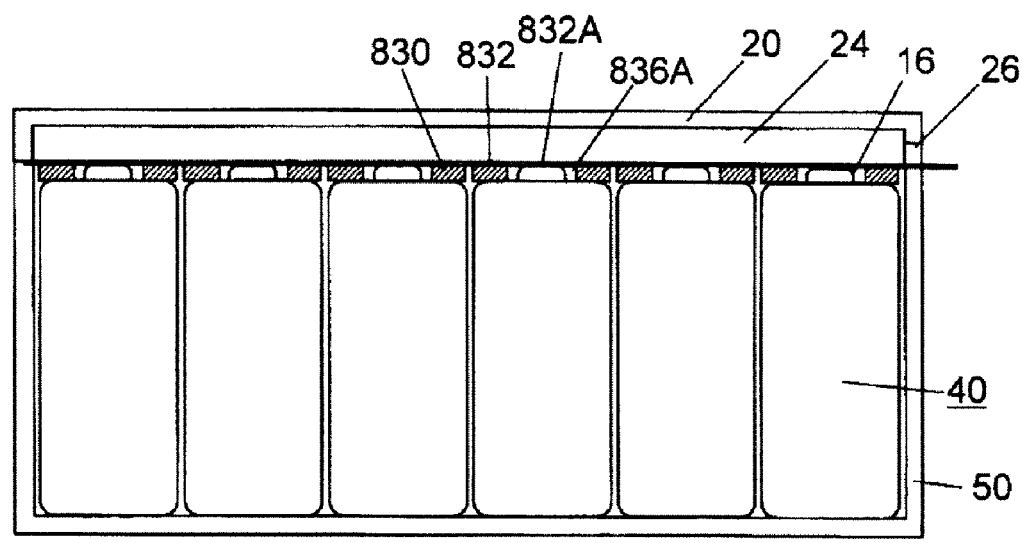
FIG. 18A is a cross-sectional view illustrating a battery module in which another example of the circuit board is used in the embodiments of the present invention.
FIG. 18B is an enlarged perspective view of a main part illustrating a state in which the connection terminal, the base of the circuit board, and the batteries of FIG. 18A are connected to each other.
Figure 18:
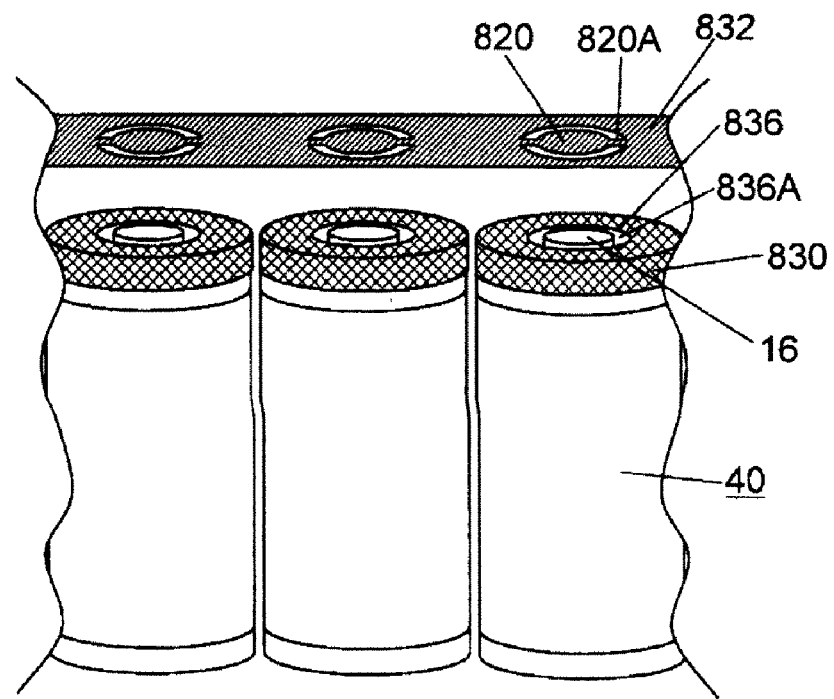

FIG. 18A is a cross-sectional view illustrating a battery module using another example circuit board in the embodiments of the present invention. FIG. 18B is an enlarged perspective view of a main part illustrating a state in which the connection terminal, the base of the circuit board, and the batteries of FIG. 18A are connected to each other.

Figure 19:
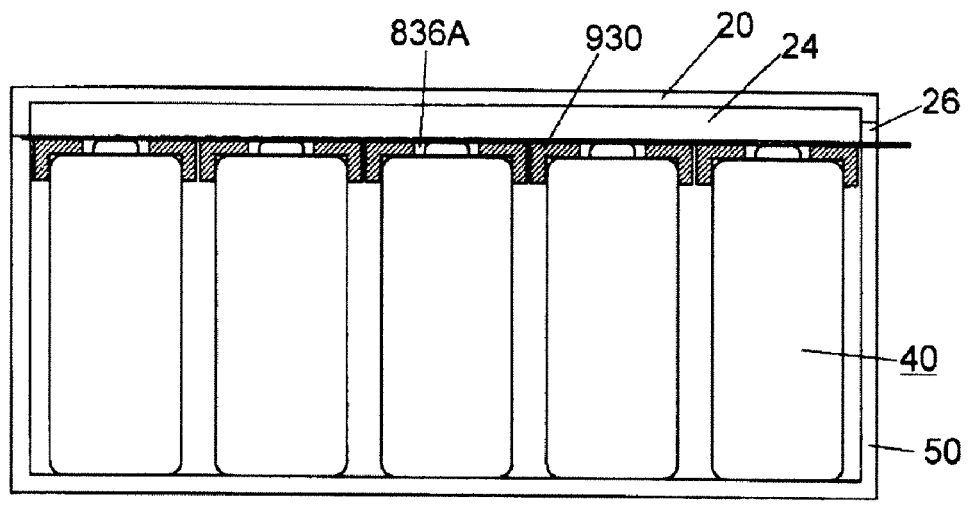
FIG. 19A is a cross-sectional view illustrating a battery module using yet another example of the circuit board in the embodiments of the present invention.
FIG. 19B is an enlarged perspective view of a main part illustrating a state in which the connection terminal, the base of the circuit board, and the batteries of FIG. 19A are connected to each other.
Figure 19:
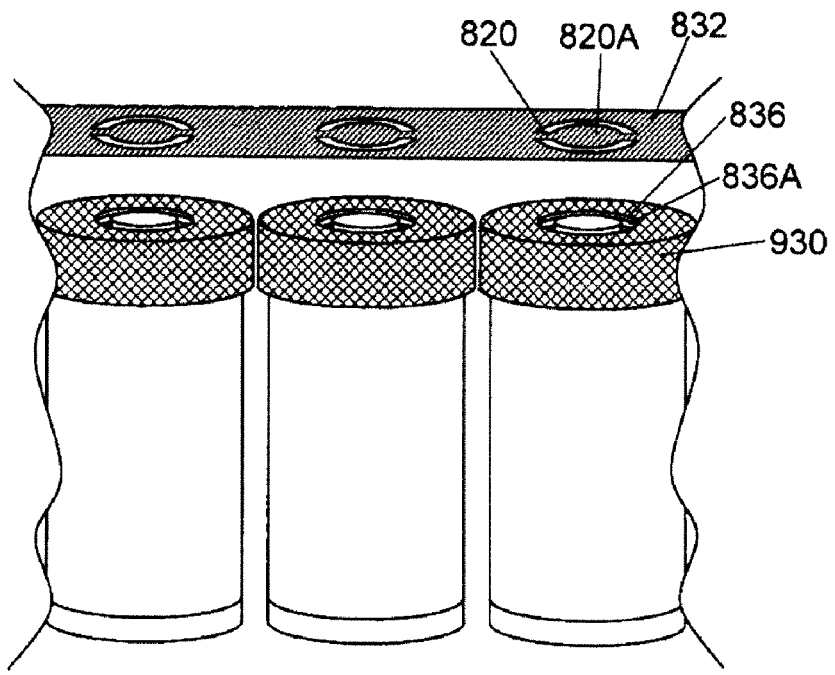

FIG. 19A is a cross-sectional view illustrating a battery module using yet another example circuit board in the embodiments of the present invention. FIG. 19B is an enlarged perspective view of a main part illustrating a state in which the connection terminal, the base of the circuit board, and the batteries of FIG. 19A are connected to each other.

First, as illustrated in FIGS. 18A and 18B, fixing members 830 are used as the base of the circuit board. The fixing members 830 correspond to batteries, respectively, which are to be connected in parallel, have substantially the same outer shape as that of the batteries, and are made of an insulating resin such as a polycarbonate resin. Here, each fixing member 830 has a through hole 836 which corresponds to a positive electrode cap 16 of the battery 40, and inside which the positive electrode cap 16 is inserted. Between the through hole 836 and the positive electrode cap 16, a gap 836A is provided.

The fixing members 830 are closely in contact with upper surfaces of battery cases. Each positive electrode cap 16 inserted inside the corresponding through hole 836 is connected to a connection portion 820 provided at a connection terminal 832.

Moreover, as illustrated in FIG. 18B, the connection portion 820 connected to the positive electrode cap 16 of the battery is connected to the connection terminal 832 via fusible links 820A which are made of bridge portions covering parts of the position of the gap 836A of the through hole 836 and have, for example, a fusible link structure. Note that as in the above embodiments, each fusible link 820A is broken by, for example, blowing at a value greater than or equal to a predetermined value of a current which flows on the occurrence of an internal short-circuit in the corresponding battery, thereby disconnecting the battery having the problem from the rest of the batteries.

In this way, advantages similar to those of the above embodiments can be obtained, and it is possible to easily obtain a battery module 800 having an arbitrary configuration.

Note that although an example in which the outer shape of the fixing members is substantially the same as that of the battery has been described in FIGS. 18A and 18B, fixing members 930 each having, for example, an L-shaped cross section may be possible as illustrated in FIGS. 19A and 19B. With this configuration, the fixing members 930 are easily positioned at the batteries, and it is possible to provide a battery module 900 in which the productivity and the workability are significantly improved.

Moreover, in the embodiments, charge/discharge of the battery module, and control circuits for detecting and controlling temperature or voltages are not described in particular or illustrated in the figures, but the control circuits may, of course, be provided outside or inside the battery module.

Moreover, in the embodiments, cylindrical batteries are described as the battery modules by way of example, but the invention is not limited to these embodiments. For example, square batteries can be used.

INDUSTRIAL APPLICABILITY

The present invention is applicable to battery modules and battery packs for vehicles, bicycles, or electric tools, in particular, hybrid vehicles or electric vehicles which require large capacities, high voltages, and also high reliability and safety for a long period of time.

DESCRIPTION OF REFERENCE CHARACTERS

1 Positive Electrode
1a Positive Electrode Current Collector
1b Positive Electrode Layer
2 Negative Electrode
3 Separator
4 Electrode Group
5 Battery Case
5a Upper Surface
6 Sealing Plate
7 Gasket
8 Positive Electrode Lead
9 Negative Electrode Lead
10a, 10b Insulating Plate
11 Negative Electrode Current Collector
15 Negative Electrode Layer
16 Positive Electrode Cap (Electrode Portion)
17, 77 Opening Portion
18 Current Cutoff Member
19 Vent Mechanism
20, 620 Lid Body
22 External Wall
24 Exhaust Chamber
26 Opening
28 Rib Portion
28A Opening Hole
30, 630 Circuit Board
30A Base
30a Heat-Resistant Member
30b Elastic Member
32, 34, 632, 832, 1032 Connection Terminal
32a Through Hole
33, 650 Connection Plate
33A, 650A Extension Portion
36, 636, 836 Through Hole
36A, 636A, 836 Gap
40 Battery
50, 660 Housing
50A, 50C Frame Body
50B Closing Member
52 Partition portion
54, 664 Storage Portion
65 Supporting Member
66 External Frame
68 Supporting Portion
100, 200, 600, 800, 900 Battery Module
320, 720, 820 Connection Portion
320A, 720A, 820A Fusible Link
400, 500 Battery Pack
450, 550 Connection Member
635 Connection Rand Portion
640 Battery assembly
645 Battery assembly set
830, 930 Fixing Member
1040 Battery
1040A Battery Having a Problem

The invention claimed is:

1. A battery module comprising:
a plurality of batteries aligned and stored in a housing, wherein
each of the batteries includes an electrode portion protruding from a battery case,
a base is arranged on a side of the electrode portions of the batteries, the electrode portions of the batteries being inserted in a plurality of through holes, respectively, provided in the base,
connection portions connected to the electrode portions are formed on upper surfaces of the electrode portions of the batteries,
a connection terminal for connecting the batteries in parallel is formed in a region on the base in which the connection terminal does not cover at least the plurality of through holes, and
the connection terminal is connected to the connection portions for the batteries by fusible links straddling the through holes.

2. The battery module of claim 1, wherein
the base is in contact with the battery cases.

3. The battery module of claim 2, wherein
a gap is provided between an outer side surface of each electrode portion and an inner side surface of the corresponding through hole.

4. The battery module of claim 1, wherein
the connection portions, the connection terminal, and the fusible links are monolithically made of a same material.

5. The battery module of claim 4, wherein
a thickness of the base is substantially the same as a height of protruding portions of the electrode portions, and
the connection portions, the connection terminal, and the fusible links are flush with each other.

6. The battery module of claim 1, wherein
the connection terminal is formed in a belt shape having a plurality of openings in positions corresponding to the electrode portions of the batteries, and
the fusible links are each provided between the connection terminal and the connection portion for the battery while straddling the opening.

7. A battery module of claim 6, wherein
an internal diameter of each opening of the connection terminal is substantially the same as that of each through hole of the base.

8. A battery module of claim 1, wherein
the connection terminal is formed in a belt shape on one side relative to the electrode portions for the batteries, and
the fusible links are each provided between the connection terminal and the connection portion for the battery while straddling the through hole.

9. The battery module of claim 2, wherein
the base is made of a flat plate,
the electrode portions of the batteries include opening portions through which gas generated in the batteries is released to an outside of the batteries, and
the housing is partitioned by the base into a storage portion in which the plurality of batteries are stored, and an exhaust chamber via which the gas released through the opening portions of the electrode portions is released to an outside of the housing, the opening portions of the electrode portions being in communication with the exhaust chamber via the through holes formed in the base.

10. The battery module of claim 2, wherein
the opening portion of each electrode portion is provided at a side surface of the electrode portion, and
an internal diameter of each through hole is larger at a position of the base where the connection terminal is formed than at a position of the base which is in contact with the battery case.

11. The battery module of claim 9, wherein
the opening portion of each electrode portion is provided at an upper surface of the electrode portion, and
the connection portion is formed in a region other than the opening portion.

12. The battery module of claim 1, wherein
the base includes bases independently provided for the batteries.

13. A battery pack comprising:
multiple ones of the battery module of claim 1, wherein
the battery modules are aligned and connected in series and/or in parallel.

* * * * *